United States Patent
Cho et al.

(10) Patent No.: US 8,049,819 B2
(45) Date of Patent: Nov. 1, 2011

(54) METHOD OF SHOOT SUPPRESSION AND AN IMAGE QUALITY IMPROVEMENT APPARATUS

(75) Inventors: Jin-Soo Cho, Yongin-si (KR); Jong-Woo Bae, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 1296 days.

(21) Appl. No.: 11/674,822

(22) Filed: Feb. 14, 2007

(65) Prior Publication Data

US 2007/0188625 A1  Aug. 16, 2007

(30) Foreign Application Priority Data

Feb. 16, 2006  (KR) .................. 10-2006-0015129

(51) Int. Cl.
*H04N 5/21* (2006.01)
(52) U.S. Cl. ....................... 348/625; 382/266
(58) Field of Classification Search .......... 348/625–630; 382/266–299
See application file for complete search history.

(56) References Cited

U.S. PATENT DOCUMENTS

| | | | | |
|---|---|---|---|---|
| 4,030,121 A | * | 6/1977 | Faroudja | 348/625 |
| 5,880,767 A | * | 3/1999 | Liu | 347/251 |
| 6,215,527 B1 | | 4/2001 | Okamoto et al. | |
| 6,690,429 B1 | | 2/2004 | Kim | |
| 6,873,372 B2 | * | 3/2005 | Hachiya et al. | 348/625 |
| 2003/0156223 A1 | | 8/2003 | Min | |

FOREIGN PATENT DOCUMENTS

| | | |
|---|---|---|
| JP | 2001-257909 | 9/2001 |
| KR | 100141782 | 3/1998 |

OTHER PUBLICATIONS

English Abstract for Publication No. 2001-257909.
English Abstract for Publication No. 100141782.

* cited by examiner

*Primary Examiner* — Michael Lee
(74) *Attorney, Agent, or Firm* — F. Chau & Associates, LLC (57) ABSTRACT

A method of shoot suppression when transition properties of an image signal are improved. The method includes improving transition properties of an original image signal and filtering a local overshoot and/or undershoot at edges of the transient-improved image signal. Accordingly, a transition time of the original image signal may be reduced and generation of shoots may be suppressed so that a quality-improved image is generated.

30 Claims, 10 Drawing Sheets

METHOD OF SHOOT SUPPRESSION AND AN IMAGE QUALITY IMPROVEMENT APPARATUS

CROSS-REFERENCE TO RELATED APPLICATIONS

This application claims priority under 35 USC §119 to Korean Patent Application No. 10-2006-15129, filed on Feb. 16, 2006 in the Korean Intellectual Property Office (KIPO), the disclosure of which is hereby incorporated by reference herein in its entirety.

BACKGROUND OF THE INVENTION

1. Technical Field

The present invention relates to image quality improvement, and more particularly to a method of shoot suppression and an image quality improving apparatus.

2. Discussion of the Related Art

A transient improvement technique for increasing sharpness of an image signal reduces an edge transition time. In the case of a luminance signal, the transient improvement technique is referred to as a luminance transient improvement (LTI) technique.

Generally, the transient improvement technique is applied to reduce the transition time and thereby increase the sharpness of an image. In reducing the transmission time, there may be sideeffects related to overshoot and/or undershoot or distortion of the image.

Figure 1:
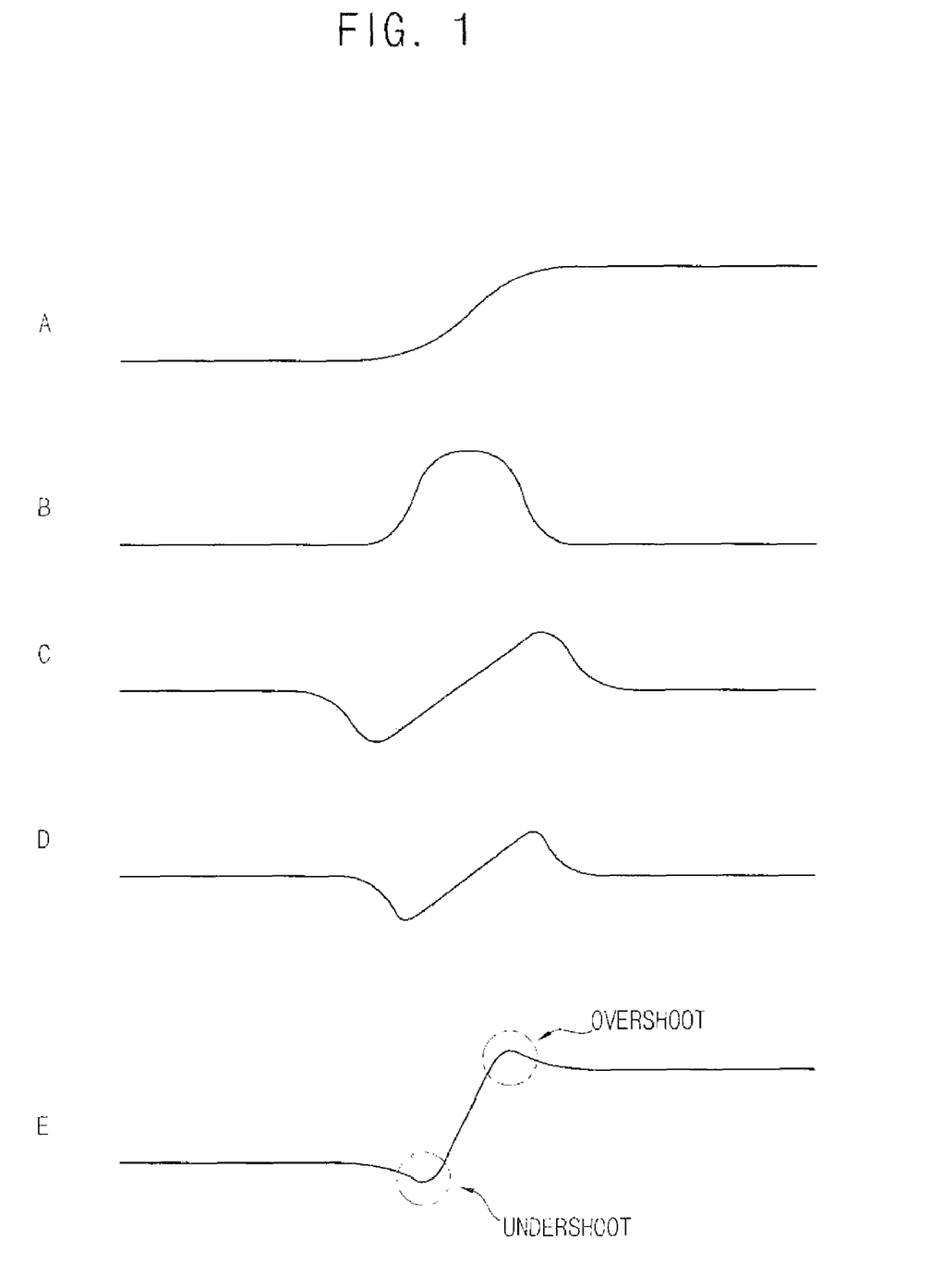
FIG. 1 is a timing diagram illustrating an example of a conventional image quality improvement process.

FIG. 1 is a timing diagram illustrating an example of a conventional image quality improvement process.

Referring to FIG. 1, an original image signal A is inputted to an image quality improving apparatus. The image quality improving apparatus generates a first derivative signal B and a second derivative signal C from the input signal A. The image quality improving apparatus multiplies the first derivative signal B by the second derivative signal C to generate an adjustment signal D. Then, the image quality improving apparatus adds the input signal A and the adjustment signal D to generate a quality-improved image signal E.

The quality-improved image signal E has a shorter transition time than the original image signal A but also has an overshoot and an undershoot. The reduction of an edge transition time may sharpen an image but the overshoot and undershoot (shoots) may distort an original image and thus degrade image quality. As the transition time becomes shorter, undershoots or overshoots that occur in the conventional image quality improvement process become larger.

SUMMARY OF THE INVENTION

Some exemplary embodiments of the present invention provide a method of shoot suppression and an image quality improving apparatus capable of reducing an edge transition time while suppressing the generation of overshoot and/or undershoot.

Some exemplary embodiments of the present invention provide a display system capable of shoot suppression and edge transition time reduction generating a quality-improved image signal while suppressing the generation of overshoot and undershoot.

Some exemplary embodiments of the present invention provide a method of shoot suppression and an image quality improving apparatus capable of reducing an edge transition time and controlling suppression of shoots.

Some exemplary embodiments of the present invention provide a display system capable of reducing an edge transition time and controlling suppression of shoots to generate a quality-improved image signal.

In some exemplary embodiments of the present invention, a method of shoot suppression improving transition properties of an image signal includes improving transition properties of an original image signal and filtering a local overshoot and/or undershoot at edges of the transient-improved image signal.

The original image signal may be a luminance signal.

Improving the transition properties of the original image signal may include generating a first derivative signal of the original image signal and a second derivative signal of the original image signal. An adjustment signal is generated by multiplying the first derivative signal by the second derivative signal. The original image signal and the adjustment signal are summed.

Filtering the local overshoot and/or undershoot may include determining whether the local overshoot and/or the local undershoot occurs at each edge of the transient-improved image signal. A maximum value of the original image signal is obtained around the edge. The obtained maximum value is set as a maximum value of the transient-improved image signal around the edge corresponding to the local overshoot. A minimum value of the original image signal around the edge is obtained. The obtained minimum value is set as a minimum value of the transient-improved image signal around the edge corresponding to the local undershoot. Filtering the local overshoot and/or undershoot may further include 3-tap filtering.

Determining whether the local overshoot and/or the local undershoot occurs may include multiplying the first derivative signal by the second derivative signal at the edge of the transient-improved image signal to obtain a product. Which shoot occurs at each edge of the transient-improved image signal is determined based on the product. Determining which shoot occurs may include determining that the overshoot occurs when the product is larger than "0" and determining that the undershoot occurs when the product is less than "0."

The method may further include determining whether each edge of the transient-improved image signal is a high frequency edge. For example, filtering the local overshoot and/or undershoot may include filtering with respect to a non-high frequency edge.

Determining whether each edge of the transient-improved image signal is the high frequency edge may include summing the first derivative signal and an absolute value of the second derivative signal to obtain a summed value. It is determined that the edge is the high frequency edge when the summed value is larger than a reference value. It is determined that the edge is the non-high frequency edge when the summed value is less than the reference value. The reference value may be user selectable.

According to exemplary embodiments of the present invention, an image quality improving apparatus includes a transient improvement circuit and a filter. The transient improvement circuit improves transition properties of an original image signal. The filter eliminates a local overshoot and/or undershoot at edges of the transient-improved image signal.

The original image signal may be a luminance signal.

The transient improvement circuit may include a differential circuit, a multiplier and an adder. The differential circuit may generate a first derivative signal of the original image signal and a second derivative signal of the original image signal. The multiplier may generate an adjustment signal by multiplying the first derivative signal by the second derivative signal. The adder may sum the original image signal and the adjustment signal.

The filter may determine whether the local overshoot or the local undershoot occurs at each edge of the transient-improved image signal. A maximum value of the original image signal around the edge may be obtained to set the obtained maximum value as a maximum value of the transient-improved image signal around the edge corresponding to the local overshoot. A minimum value of the original image signal around the edge may be obtained to set the obtained minimum value as a minimum value of the transient-improved image signal around the edge corresponding to the local undershoot. The filter may perform 3-tap filtering.

The filter may obtain a product by multiplying the first derivative signal by the second derivative signal at an edge of the transient-improved image signal and may determine whether an overshoot or an undershoot occurs at the edge of the transient-improved image signal based on the product. The filter may determine that the overshoot occurs when the product is larger than "0" and that the undershoot occurs when the product is less than "0."

The apparatus may further include a suppression controller. The suppression controller may determine whether each edge of the transient-improved image signal is a high frequency edge. The suppression controller may control the filter so that the filter performs filtering only with respect to a non-high frequency edge. The suppression controller may determine that the edge is the high frequency edge when a summed value of the first derivative signal and an absolute value of the second derivative signal at the edge is larger than a reference value. The suppression controller may determine that the edge is the non-high frequency edge when the summed value is less than the reference value. The suppression controller may receive the reference value from a reference value register.

According to exemplary embodiments of the present invention, a display system includes an image source, an image quality improving apparatus, and a display device. The image source generates an original image signal. The image quality improving apparatus improves image quality of the original image and includes a transient improvement circuit and a filter. The transient improvement circuit improves transition properties of the original image signal. The filter eliminates a local overshoot and/or undershoot at edges of the transient-improved image signal. The display device displays the quality-improved image signal.

The original image signal may be a luminance signal.

The transient improvement circuit may include a differential circuit, a multiplier and an adder. The differential circuit may generate a first derivative signal of the original image signal and a second derivative signal of the original image signal. The multiplier may generate an adjustment signal by multiplying the first derivative signal by the second derivative signal. The adder may sum the original image signal and the adjustment signal.

The filter may determine whether the local overshoot or the local undershoot occurs at each edge of the transient-improved image signal. The filter may also obtain a maximum value of the original image signal around the edge to set the obtained maximum value of the original image signal around the edge to set the obtained maximum value as a maximum value of the transient-improved image signal around the edge corresponding to the local overshoot. The filter may also obtain a minimum value of the original image signal around the edge to set the obtained minimum value as a minimum value of the transient-improved image signal around the edge corresponding to the local undershoot. The filter may perform 3-tap filtering.

The filter may obtain a product by multiplying the first derivative signal by the second derivative signal at an edge of the transient-improved image signal. The filter may also determine whether an overshoot or an undershoot occurs at the edge of the transient-improved image signal based on the product. The filter may determine that the overshoot occurs when the product is larger than "0" and that the undershoot occurs when the product is less than "0."

The apparatus may further include a suppression controller. The suppression controller may determine whether each edge of the transient-improved image signal is a high frequency edge. The suppression controller may also control the filter so that the filter performs filtering only with respect to a non-high frequency edge. The suppression controller may determine that the edge is the high frequency edge when a summed value of the first derivative signal and an absolute value of the second derivative signal at the edge is larger than a reference value. The suppression controller may also determine that the edge is the non-high frequency edge when the summed value is less than the reference value.

Therefore, the method of shoot suppression, the image quality improvement apparatus and the display system according to exemplary embodiments of the present invention may reduce a transition time and may suppress generation of shoot to generate a quality-improved image with suppressing generation of overshoot and/or undershoot and/or with controlling shoot suppression.

BRIEF DESCRIPTION OF THE DRAWINGS

These and/or other aspects and features of the exemplary embodiments of the present invention are described below in conjunction with the accompanying drawings of which.

DESCRIPTION OF THE EXEMPLARY EMBODIMENTS

Exemplary embodiments of the present invention are described below with reference to the accompanying drawings. The invention may, however, be embodied in many different forms and should not be construed as limited to the exemplary embodiments set forth herein. Like reference numerals may refer to like elements throughout this application.

It will be understood that when an element is referred to as being "connected" or "coupled" to another element, it can be directly connected or coupled to the other element or intervening elements may be present. Other words used to describe the relationship between elements should be interpreted in a like fashion (e.g., "between," "adjacent," etc.).

Figure 2:
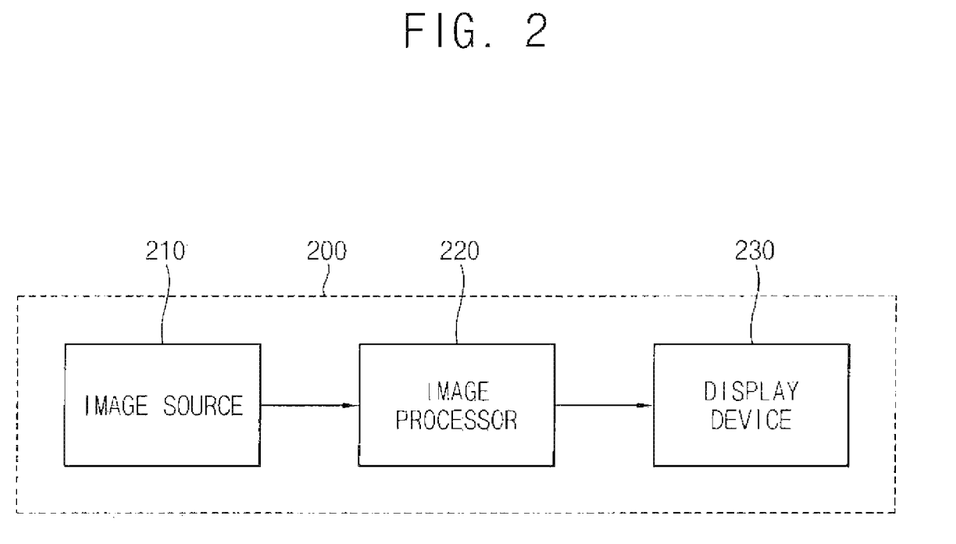
FIG. 2 is a block diagram illustrating a display system according to an exemplary embodiment of the present invention.

FIG. 2 is a block diagram illustrating a display system according to an exemplary embodiment of the present invention.

Referring to FIG. 2, the display system 200 includes an image source 210, an image processor 220 and a display device 230.

The image source 210 generates an original image to be displayed. The image source 210 may be variously implemented depending on functions of the display system 200. For example, in a case where the display system 200 is a digital television (TV), the image source 210 may include a radio frequency (RF) receiver, a demultiplexer, a video decoder and the like. The RF receiver receives a broadcast signal. The demultiplexer separates a video signal from the received broadcast signal. The video decoder decodes the separated video signal and provides an image that is reconstructed by the video decoder to the image processor 220. For example, in a case where the display system 200 is a digital camera, the image source 210 may include an image sensor, an analog-to-digital converter (ADC) and the like. The ADC converts an analog image provided by the image sensor to a digital image and provides the digital image to the image processor 220.

The image processor 220 processes the original image received from the image source 210. For example, the image processor 220 may control brightness, sharpness and/or contrast of the original image. Thus, the image processor 220 may include hardware and/or software for performing the above functions. For example, the image processor 220 may be implemented with software including instructions for performing the functions and a digital signal processor (DSP) executing the instructions. An image quality improving apparatus according to an exemplary embodiment of the present invention may be included in the image processor 220. Accordingly, the image quality improving apparatus may improve transition properties at an edge of the original image and may suppress shoots that occur when the original image signal is processed to improve the transition properties of the image signal.

The display device 230 displays an image having an improved image quality in comparison with the original image, using an output signal of the image processor 220. The display device 230 may be a liquid crystal display (LCD), an organic light-emitting diode (OLED) display, a cathode-ray tube (CRT), a plasma display panel (PDP) and the like.

Figure 3:
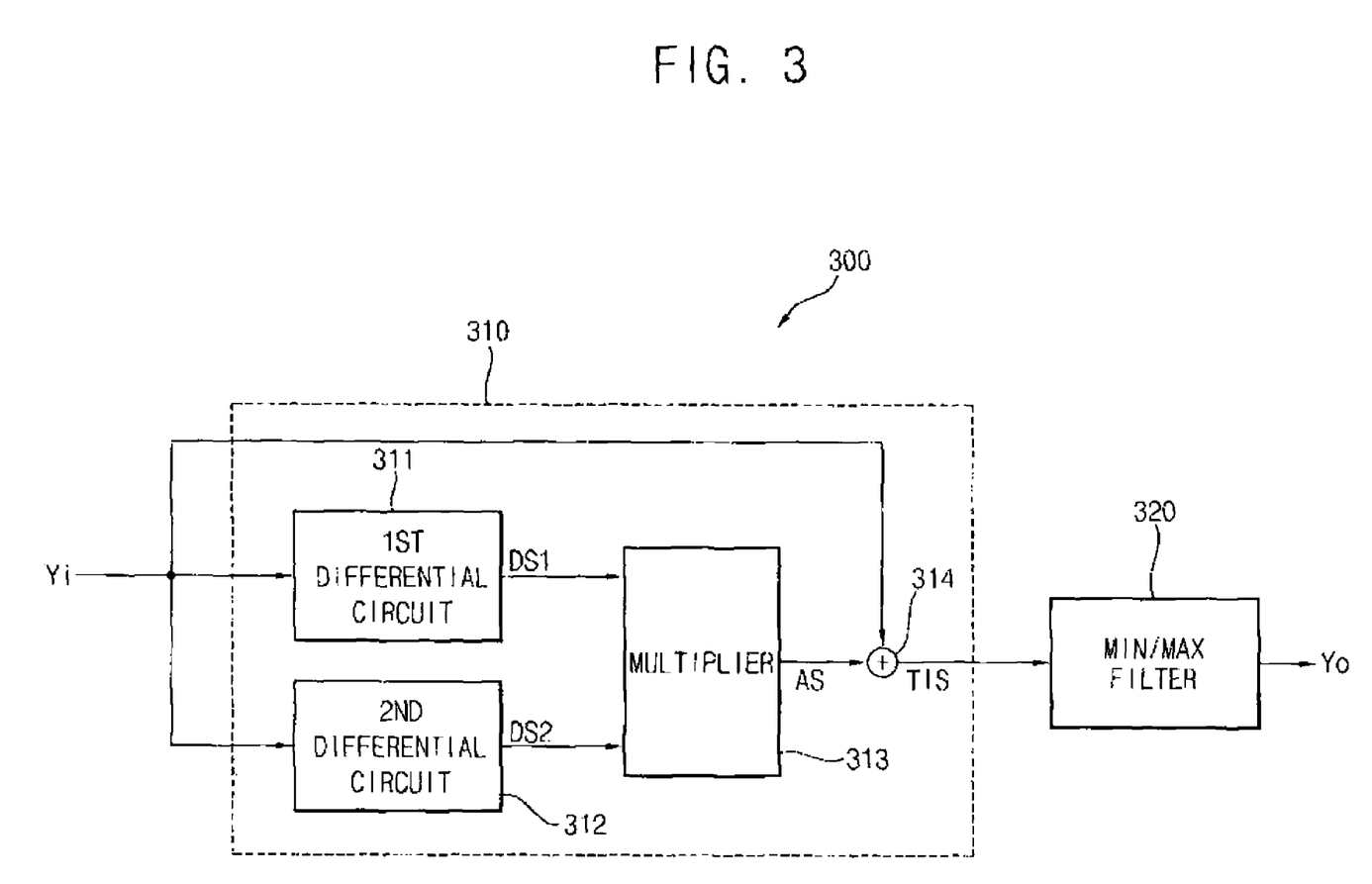
FIG. 3 is a block diagram illustrating an image quality improving apparatus according to an exemplary embodiment of the present invention.

FIG. 3 is a block diagram illustrating an image quality improving apparatus according to an exemplary embodiment of the present invention.

Referring to FIG. 3, the image quality improving apparatus 300 includes a transient improvement circuit 310 and a min/max filter 320. According to exemplary embodiments of the present invention, the image quality improving apparatus 300 receives a luminance signal and improves horizontal transition properties of the luminance signal.

The transient improvement circuit 310 improves transition properties of an original image signal Yi. For example, the transient improvement circuit 310 reduces a transition time at an edge of the original image signal Yi to generate a transient-improved image signal TIS. The transient improvement circuit 310 includes a first differential circuit 311, a second differential circuit 312, a multiplier 313 and an adder 314.

The first differential circuit 311 generates a first derivative signal DS1 of the original image signal Yi, and the second differential circuit 312 generates a second derivative signal DS2 of the original image signal Yi. In the exemplary embodiments described above with reference to FIG. 3, the second differential circuit 312 receives the original image signal Yi directly. According to other exemplary embodiments, the second differential circuit 312 may receive the first derivative signal DS1 to generate the second derivative DS2. In addition, the image quality improving apparatus 300 may include one differential circuit generating both the first derivative signal DS1 and the second derivative signal DS2.

The multiplier 313 multiplies the first derivative signal DS1 by the second derivative signal DS2 to generate an adjustment signal AS. The adder 314 adds the original image signal Yi and the adjustment signal AS to generate the transient-improved image signal TIS.

The min/max filter 320 eliminates local overshoots and undershoots that occur at edges of the transient-improved image signal TIS.

The min/max filter 320 determines whether each edge of the transient-improved signal TIS is locally overshot or undershot. For example, the min/max filter 320 multiplies a first differentiated value of the original image signal Yi by a second differentiated value of the original image signal Yi. The min/max filter 320 determines that the edge corresponds to an overshoot when the product is larger than "0" and the edge corresponds to an undershoot when the product is less than "0."

Where the overshoot occurs at an edge of the transient-improved image signal TIS, the min/max filter 320 obtains a local maximum value around an edge of the original image signal Yi and then sets the obtained value as a local maximum value of the original image signal Yi. Where the undershoot occurs at the edge of the transient-improved image signal TIS, the min/max filter 320 obtains a local minimum value around the edge of the original image signal Yi and then sets the obtained value as a local minimum value of the original image signal Yi.

In one exemplary embodiment of the present invention, the min/max filter 320 may perform 3-tap filtering with respect to the edge of the transient-improved image signal TIS. In another exemplary embodiment of the present invention, the min/max filter 320 may perform 4-tap filtering. However, when filtering is performed with more than 4 taps, operation amounts of the min/max filter 320 may be increased. For example, when there are many high-frequency edges, it could be difficult to calculate the local maximum/minimum value. 3-tap filtering is performed according to Expression 1 described below.

$$y\_out[m][n] = y\_local\_max[m][n] = \max(y\_in[m][n-1], y\_in[m][n], y\_in[m][n+1]), \text{if } T >= 0 \quad \text{[Expression 1]}$$

$$y\_out[m][n] = y\_local\_min[m][n] = \min(y\_in[m][n-1], y\_in[m][n], y\_in[m][n+1]), \text{if } T < 0$$

$T$ = (horizontal normalized first derivative)*(horizontal second derivative)

Here, "y_in" denotes a value of the original image signal Yi and "y_out" denotes a value of an output signal Yo generated from the min/max filter 320. For example, a value obtained by filtering the edge of the transient-improved image signal TIS. In addition, "T" is a reference value for determining whether the edge of the transient-improved image signal TIS is a local overshoot or a local undershoot. When T is larger than "0," the edge corresponds to the overshoot. When T is less than "0," the edge corresponds to the undershoot.

The image quality improving apparatus 300 in FIG. 3 may be implemented to suppress the overshoot and undershoot from occurring in the transient-improved image signal TIS by using the min/max filter 320. Image quality degradation may be caused when suppressing overshoot and undershoot at edges of letters and diagonal lines superimposed on an image. For example, line widths of the letters may be increased, decreased, or jagging may result. Therefore, there is a need to control suppression of shoots depending on image characteristics. An image quality improving apparatus capable of controlling suppression of shoots will be described below with reference to FIG. 4.

Figure 4:
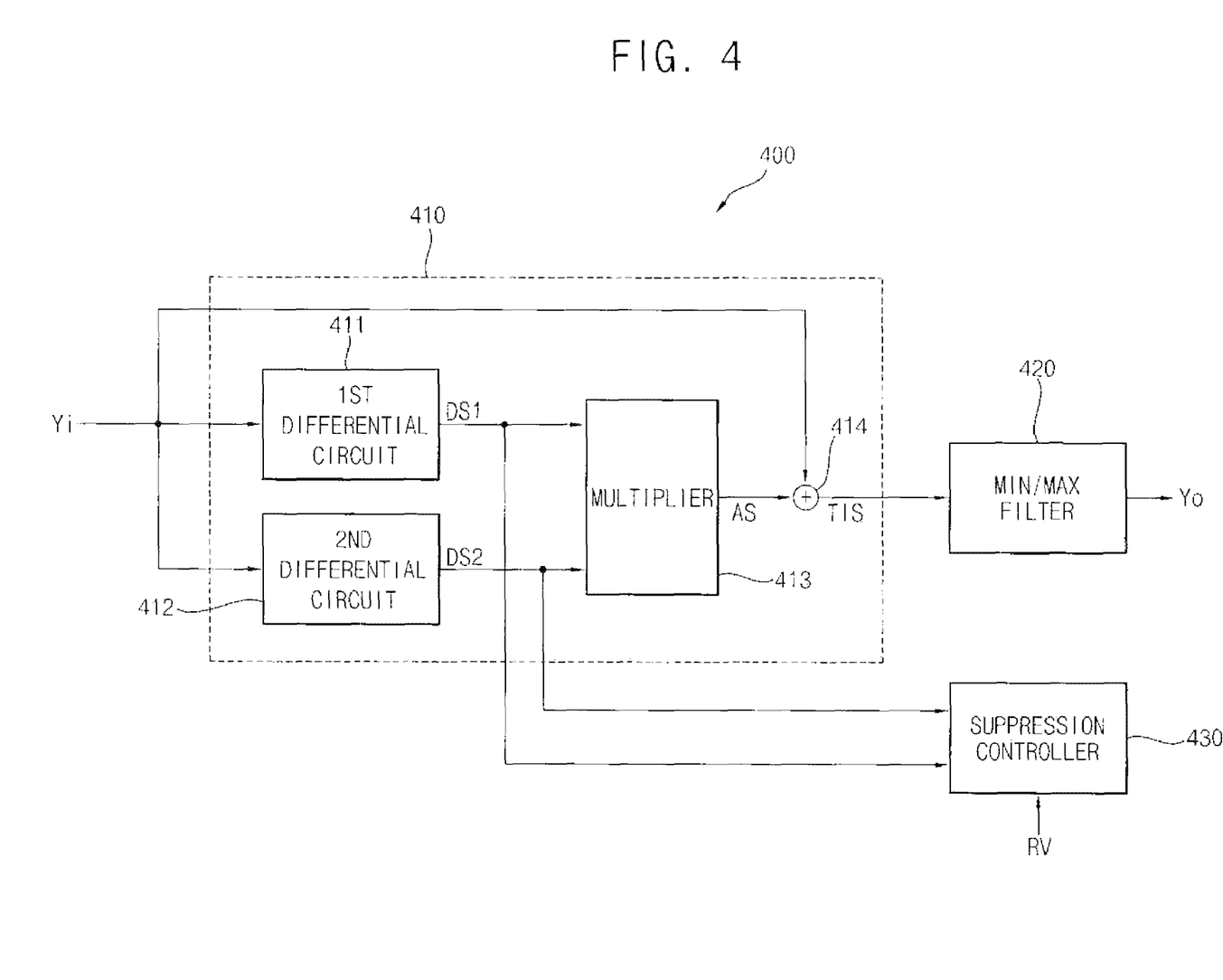
FIG. 4 is a block diagram illustrating an image quality improving apparatus according to another exemplary embodiment of the present invention.

FIG. 4 is a block diagram illustrating an image quality improving apparatus according to another exemplary embodiment of the present invention.

Referring to FIG. 4, the image quality improving apparatus 400 includes a transient improvement circuit 410 and a min/max filter 420. According to exemplary embodiments of the present invention, the image quality improving apparatus 400 receives a luminance signal to improve horizontal transition properties of the image signal. The image quality improving apparatus 400 further includes a suppression controller 430. The function and operation of the transient improvement circuit 410 and the min/max filter 420 are substantially the same as those of the transient improvement circuit 310 and the min/max filter 320 in FIG. 3.

The suppression controller 430 determines whether each edge of the transient-improved image signal TIS is a high frequency edge. The suppression controller 430 controls the min/max filter 420. For example, the suppression controller 430 causes the min/max filter 420 to perform filtering with respect to a non-high frequency edge.

When a sum of an absolute value of the first derivative signal DS1 and an absolute value of the second derivative signal DS2 is larger than a reference value RV, the suppression controller 430 determines that the edge of the transient-improved image signal TIS is the high frequency edge. When the sum of the absolute value of the first derivative signal DS1 and the absolute value of the second derivative signal DS2 is less than the reference value RV, the suppression controller 430 determines that the edge of the transient-improved image signal TIS is the non-high frequency edge. The suppression controller 430 may receive the reference value RV from a reference value register (not shown). The reference value RV may be changeable by a user.

Figure 5:
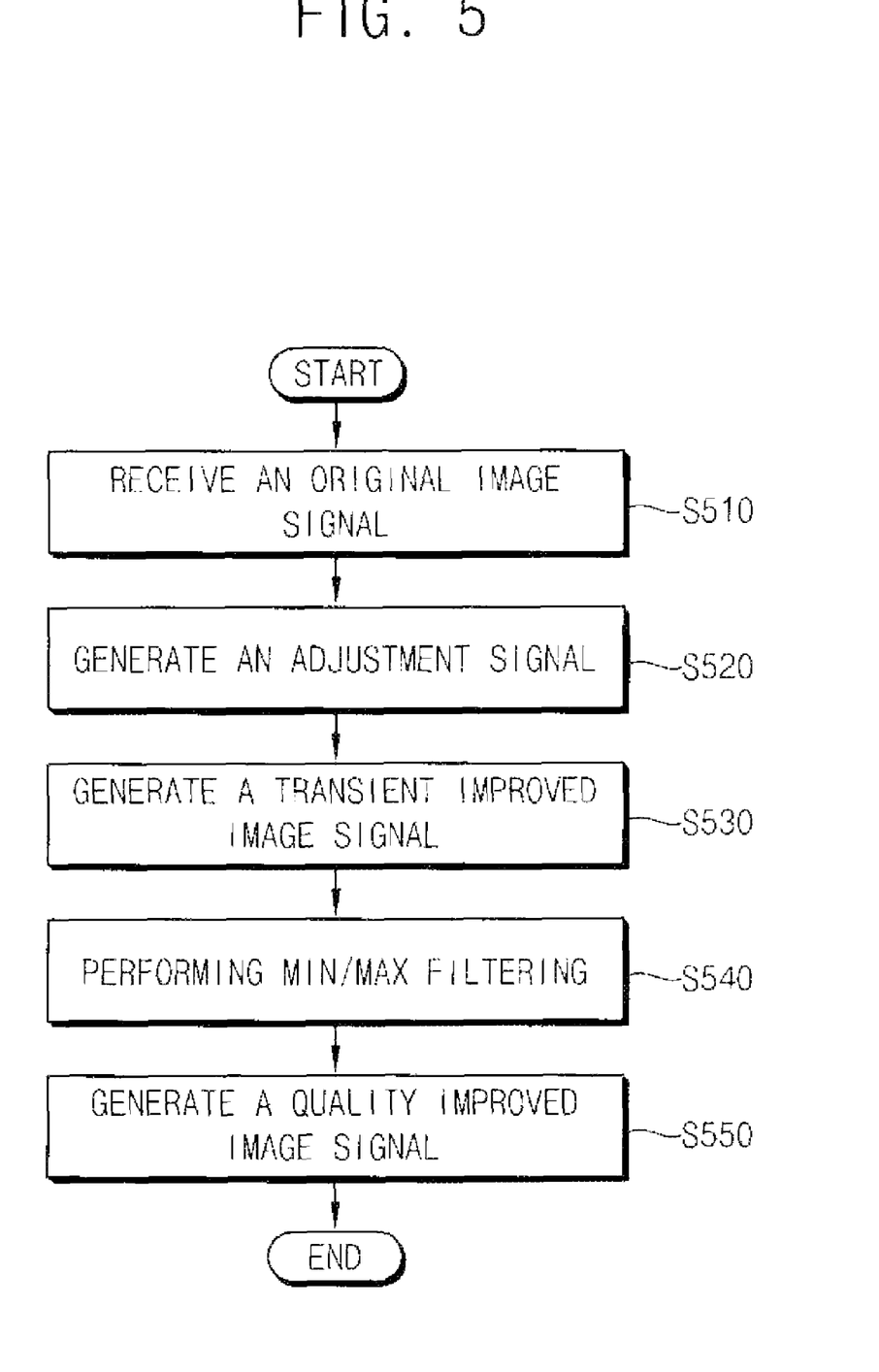
FIG. 5 is a flow chart illustrating an image quality improvement process according to an exemplary embodiment of the present invention.

FIG. 5 is a flow chart illustrating an image quality improvement process according to an exemplary embodiment of the present invention.

Referring to FIG. 5, an image quality improving apparatus receives an original image signal (Step S510).

The image quality improving apparatus generates an adjustment signal (Step S520). According to exemplary embodiments of the present invention, the image quality improving apparatus generates a first derivative signal of the original image signal and a second derivative signal of the original image signal and then generates the adjustment signal by multiplying the first derivative signal by the second derivative signal.

When the adjustment signal is generated, the image quality improving apparatus generates a transient-improved image signal by summing the original image signal and the adjustment signal (Step S530).

The image quality improving apparatus performs min/max filtering for suppressing generation of shoots in the transient-improved image signal (Step S540).

When the min/max filtering is finished, the image quality improving apparatus generates a quality-improved image signal (Step S550).

The min/max filtering may be performed at every edge of the transient-improved image signal and may be performed at an edge selected depending on edge characteristics. The min/max filtering depending on the edge characteristics will be described below with reference to FIG. 6.

Figure 6:
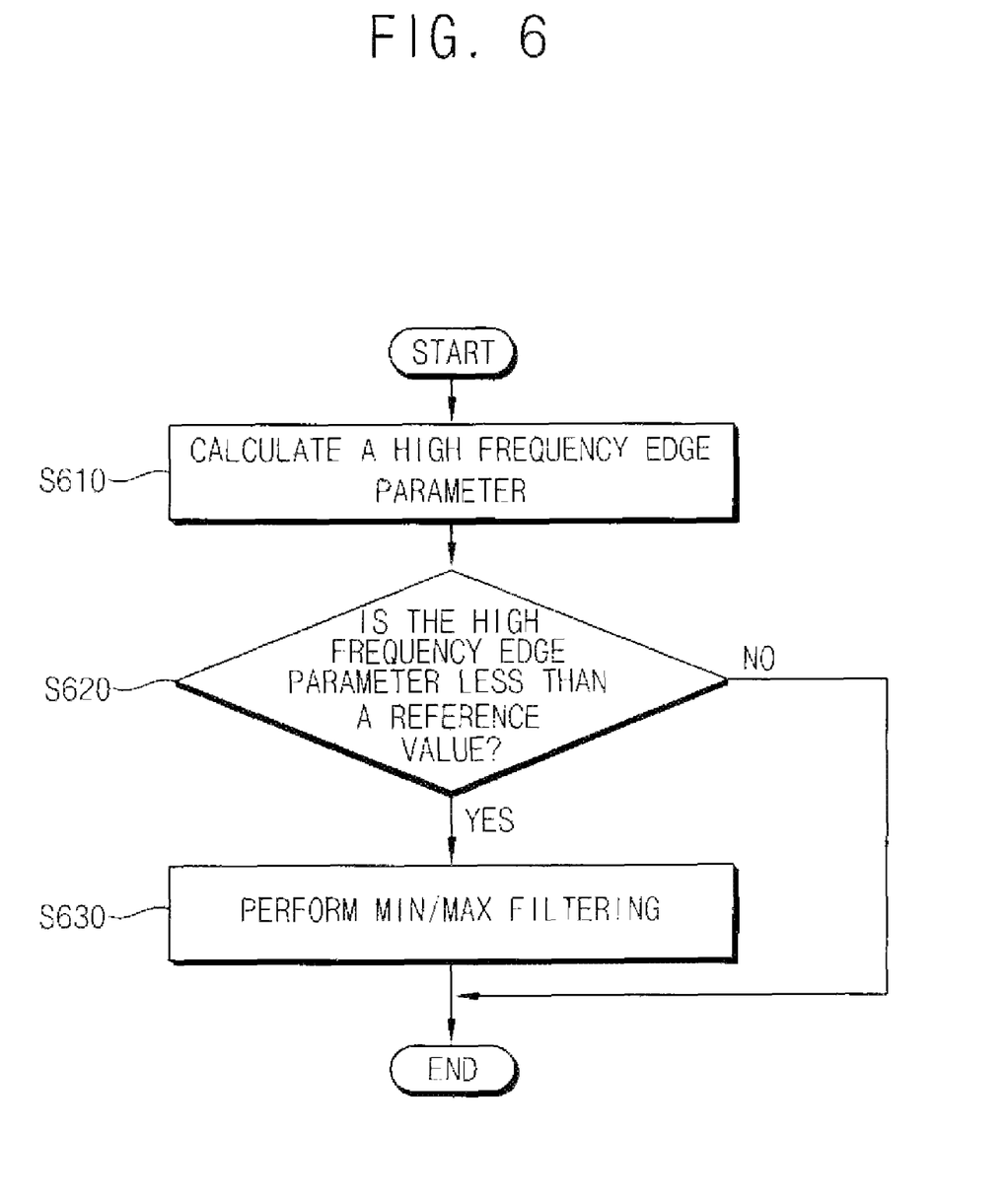
FIG. 6 is a flow chart illustrating a filtering process according to an exemplary embodiment of the present invention.

FIG. 6 is a flow chart illustrating a filtering process according to an exemplary embodiment of the present invention.

Referring to FIG. 6, an image quality improving apparatus calculates a high frequency edge parameter D (Step S610). The high frequency edge parameter D is calculated by Expression 2 described below.

$$D=\text{normalize}(\text{horizontal\_first\_derivative}+\text{abs}(\text{horizontal\_second\_derivative}))  \quad \text{[Expression 2]}$$

Here, "horizontal_first_derivative" denotes a first derivative signal of an original image signal and "abs(horizontal_second_derivative)" denotes an absolute value of a second derivative signal of the original image signal.

The function "normalize()" normalizes the high frequency edge parameter D to have a value between "0" and "1."

The image quality improving apparatus compares the high frequency edge parameter D with a reference value (Step S620). The reference value may be set as either "0" or "1" by a user.

The image quality improving apparatus performs min/max filtering with respect to an edge of a transient-improved image signal when the high frequency edge parameter D is less than the reference value (Step S630). Otherwise, the image quality improving apparatus does not perform min/max filtering.

Figure 7:
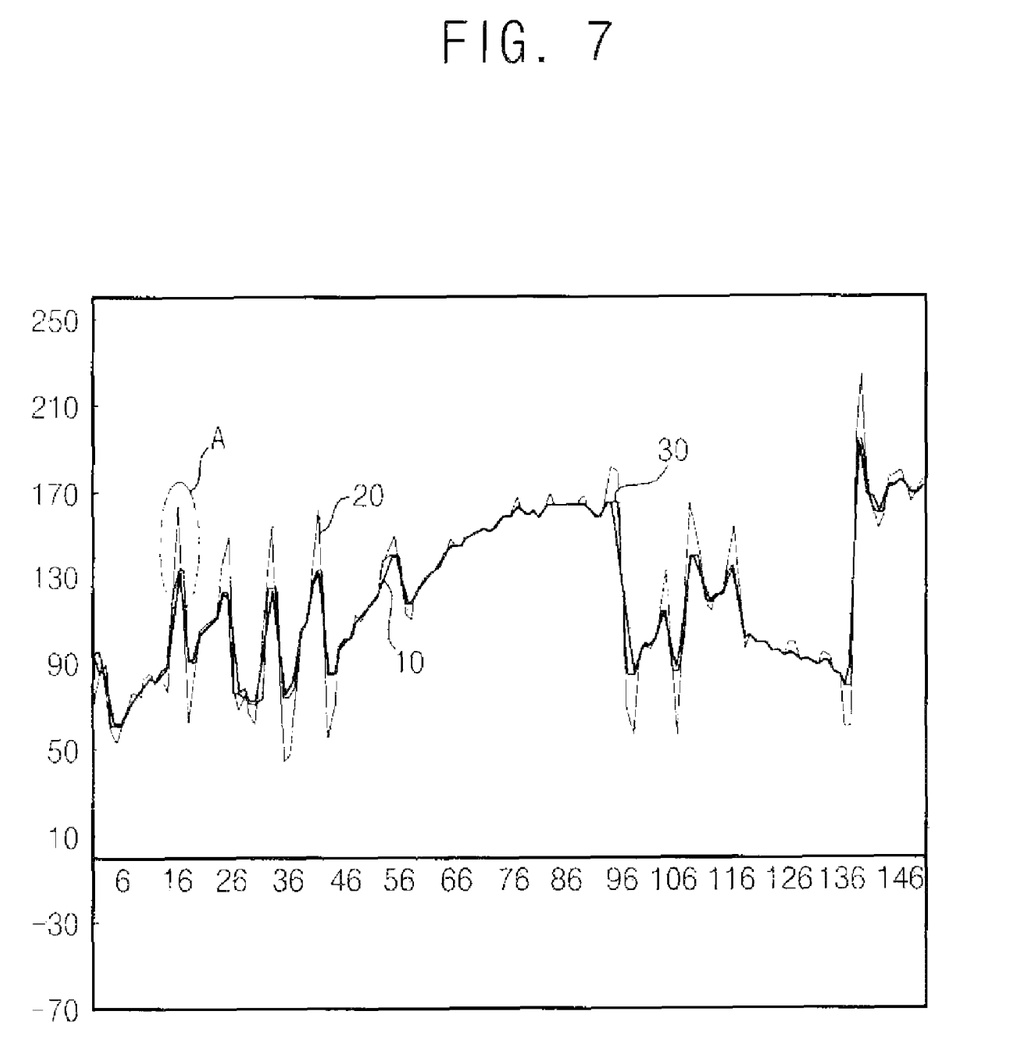
FIG. 7 is a graph illustrating a performance of the image quality improving apparatus of FIG. 3.

FIG. 7 is a graph for illustrating a performance of the image quality improving apparatus of FIG. 3.

Referring to FIG. 7, a transition time is reduced when an original image signal 10 is processed. The processed signal 20 illustrates the result of a conventional luminance transient improvement (LTI) technique and the processed signal 30 illustrates the result of an LTI technique including filtering according to one exemplary embodiment of the present invention.

In region A, an overshoot occurs when the original image 10 is processed by the conventional LTI technique. The overshoot does not occur when the original image 10 is processed by the LTI technique according to one exemplary embodiment of the present invention.

Figure 8:
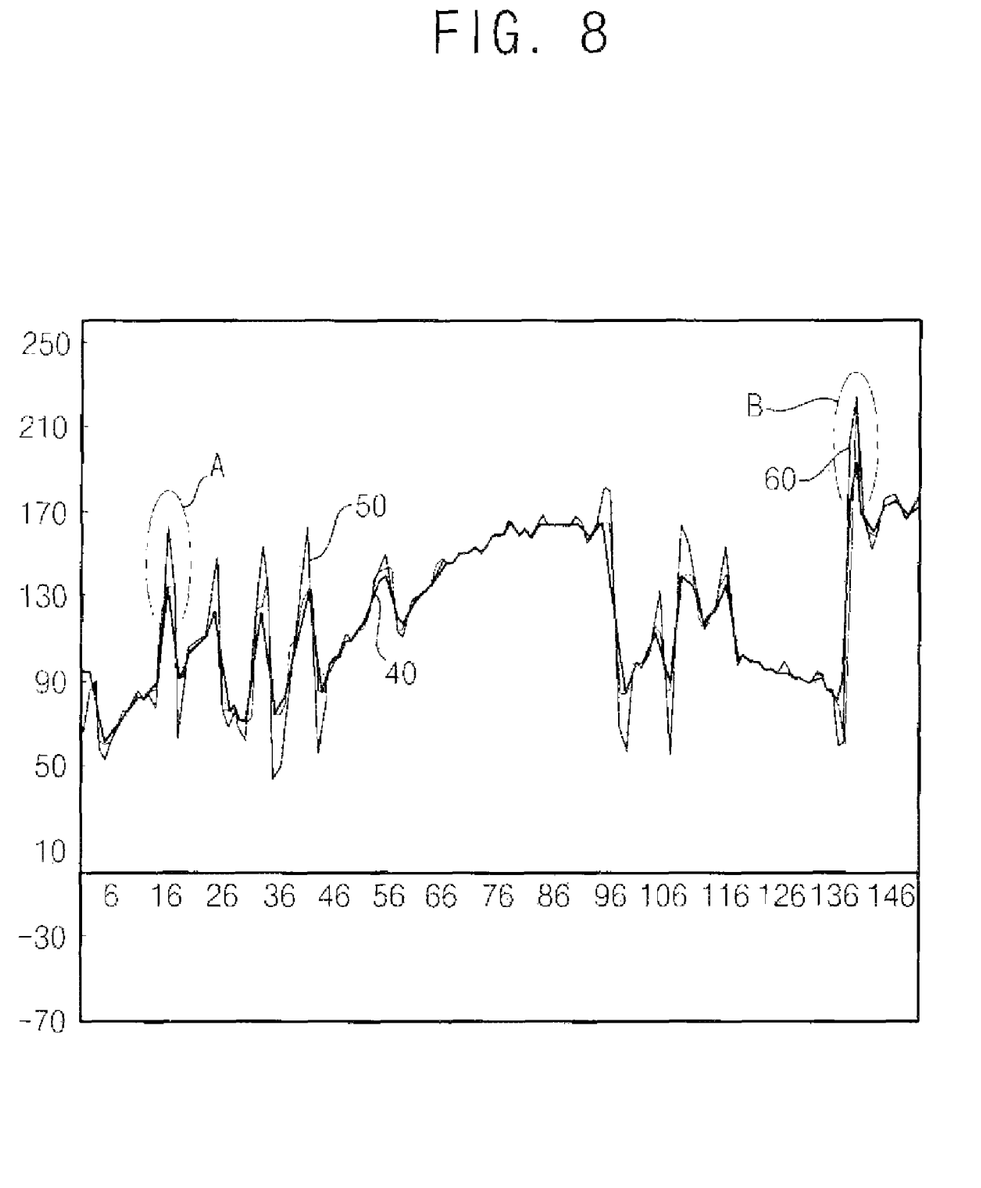
FIG. 8 is a graph illustrating a performance of an image quality improving apparatus of FIG. 4.

FIG. 8 is a graph illustrating performance of an image quality improving apparatus of FIG. 4.

Referring to FIG. 8, a transition time is reduced when an original image signal 40 is processed. The processed signal 50 illustrates the result of a conventional luminance transient improvement (LTI) technique and the processed signal 60 illustrates the result of an LTI technique including frequency adaptive filtering according to another exemplary embodiment of the present invention.

In region A, an overshoot occurs when the original image signal 40 is processed by the conventional LTI technique, but does not occur when the original image 40 is processed by the LTI technique including frequency adaptive filtering 60 according to exemplary embodiments of the present invention.

In a region B, the overshoot occurs when the original image 40 is processed by the LTI technique including frequency adaptive filtering according to another exemplary embodiment of the present invention. This is different than the result of the LTI technique including filtering according to the exemplary embodiment of the present invention discussed above with reference to FIG. 7. For example, the LTI technique including frequency adaptive filtering 60 does not perform min/max filtering at a high frequency edge.

Figure 9:
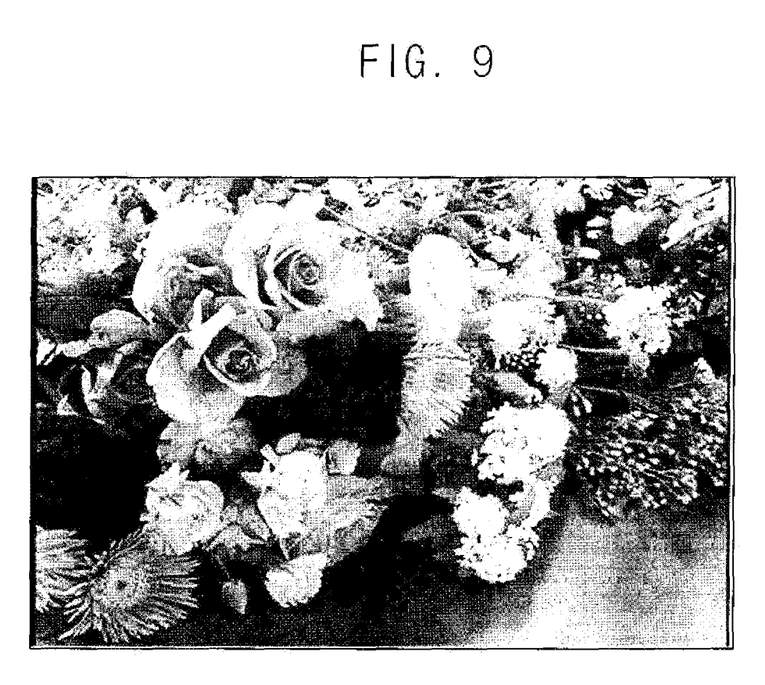
FIG. 9 is a view showing an example of an original image.
Figure 10:
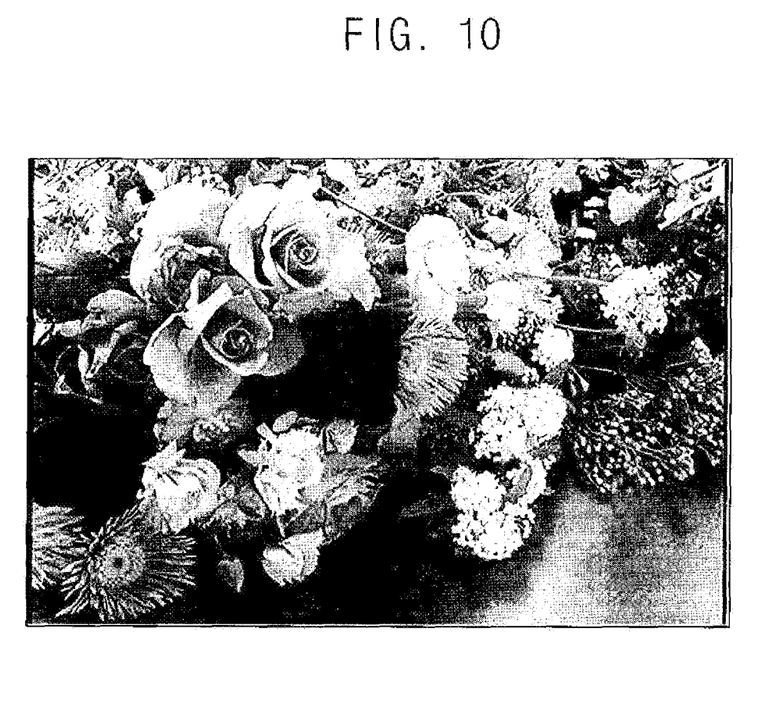
FIG. 10 is a view showing an example of a quality-improved image by a conventional luminance transient improvement (LTI) technique.
Figure 11:
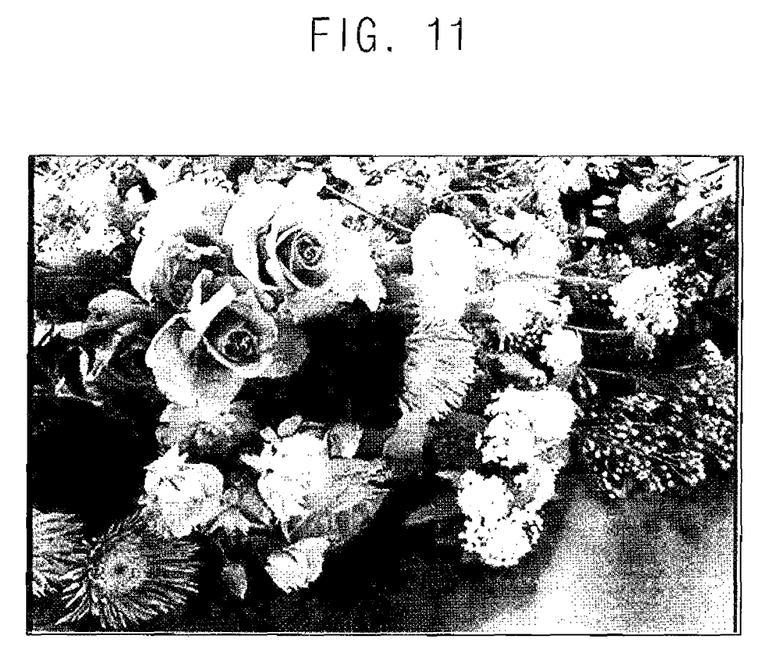
FIG. 11 is a view showing an example of a quality-improved image by an LTI technique using the image quality improving apparatus of FIG. 3.
Figure 12:
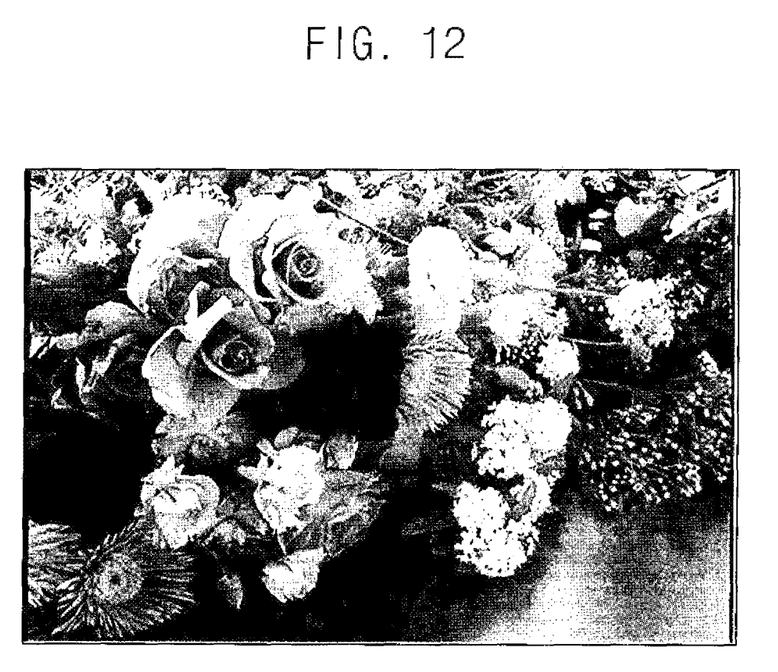
FIG. 12 is a view showing an example of a quality-improved image by an LTI technique using the image quality improving apparatus of FIG. 4.

FIG. 9 an example of an original image. FIG. 10 is an example of a quality-improved image by a conventional luminance transient improvement (LTI) technique. FIG. 11 is an example of a quality-improved image by an LTI technique using the image quality improving apparatus of FIG. 3. FIG. 12 is an example of a quality-improved image by an LTI technique using the image quality improving apparatus of FIG. 4.

As mentioned above, a method of shoot suppression and an image quality improving apparatus according to an exemplary embodiment of the present invention may reduce a transition time at an edge of an original image to generate a quality-improved image with suppressing generation of overshoot and undershoot.

In addition, a method of shoot suppression and an image quality improving apparatus according to another exemplary embodiment of the present invention may reduce a transition time at an edge of an original image and may control suppression of generation of shoots based on edge characteristics.

While the exemplary embodiments of the present invention have been described in detail, it should be understood that various changes, substitutions and alterations may be made herein without departing from the scope of the invention.

What is claimed is:

1. A method of shoot suppression of an image signal, comprising:
reducing edge transition time of an original image signal to form a transient-improved image signal;
determining whether each edge of the transient-improved image signal is locally an overshoot or an undershoot; and
filtering an overshoot or an undershoot at an edge of the transient-improved image signal by using a local maximum or minimum value around an edge of the original image as a local maximum or minimum value of the original image when it is determined that an edge of the transient-improved image signal is locally an overshoot or an undershoot.

2. The method of claim 1, wherein the original image signal is a luminance signal.

3. The method of claim 1, wherein reducing edge transition time of the original image signal comprises:
generating a first derivative signal of the original image signal and a second derivative signal of the original image signal;
generating an adjustment signal by multiplying the first derivative signal by the second derivative signal; and
summing the original image signal and the adjustment signal.

4. The method of claim 1, wherein filtering the overshoot or the undershoot comprises:
determining whether the overshoot or the undershoot occurs at the edge of the transient-improved image signal;
obtaining a maximum value of the original image signal around the edge to set the obtained maximum value as a maximum value of the transient-improved image signal around the edge corresponding to the overshoot; and
obtaining a minimum value of the original image signal around the edge to set the obtained minimum value as a minimum value of the transient-improved image signal around the edge corresponding to the undershoot.

5. The method of claim 4, wherein filtering the overshoot or the undershoot further comprises 3-tap filtering.

6. A method of shoot suppression of an image signal, comprising:
reducing edge transition time of an original image signal to form a transient-improved image signal; and
filtering an overshoot or an undershoot at an edge of the transient-improved image signal,
wherein filtering the overshoot or the undershoot comprises:
determining whether the overshoot or the undershoot occurs at the edge of the transient-improved image signal;
obtaining a maximum value of the original image signal around the edge to set the obtained maximum value as a maximum value of the transient-improved image signal around the edge corresponding to the overshoot; and
obtaining a minimum value of the original image signal around the edge to set the obtained minimum value as a minimum value of the transient-improved image signal around the edge corresponding to the undershoot,
wherein determining whether the overshoot or the undershoot occurs comprises:
multiplying the first derivative signal by the second derivative signal at the edge of the transient-improved image signal to obtain a product; and
determining which shoot occurs at each edge of the transient-improved image signal based on the product.

7. The method of claim 6, wherein determining which shoot occurs comprises:
determining that the overshoot occurs when the product is larger than "0"; and
determining that the undershoot occurs when the product is less than "0".

8. A method of shoot suppression of an image signal, comprising:
reducing edge transition time of an original image signal to form a transient-improved image signal;
filtering an overshoot or an undershoot at an edge of the transient-improved image signal; and
determining whether each edge of the transient-improved image signal is a high frequency edge,
wherein filtering the overshoot or the undershoot comprises filtering with respect to a non-high frequency edge.

9. The method of claim 8, wherein determining whether each edge of the transient-improved image signal is the high frequency edge comprises:
summing the first derivative signal and an absolute value of the second derivative signal to obtain a summed value;
determining that the edge is the high frequency edge when the summed value is larger than a reference value; and
determining that the edge is the non-high frequency edge when the summed value is less than the reference value.

10. The method of claim 9, wherein the reference value is user selectable.

11. An image quality improving apparatus comprising:
a transient improvement circuit configured to reduce edge transition time of an original image signal to form a transient-improved image signal; and
a filter configured to determine whether each edge of the transient-improved image signal is locally an overshoot or an undershoot and eliminate an overshoot or an undershoot at an edge of the transient-improved image signal by using a local maximum or minimum value around an edge of the original image as a local maximum or minimum value of the original image when it is determined that an edge of the transient-improved image signal is locally an overshoot or an undershoot.

12. The apparatus of claim 11, wherein the original image signal is a luminance signal.

13. The apparatus of claim 11, wherein the transient improvement circuit comprises:
a differential circuit configured to generate a first derivative signal of the original image signal and a second derivative signal of the original image signal;
a multiplier configured to generate an adjustment signal by multiplying the first derivative signal by the second derivative signal; and
an adder configured to sum the original image signal and the adjustment signal.

14. The apparatus of claim 11, wherein the filter determines whether the overshoot or the undershoot occurs at each edge of the transient-improved image signal;
obtains a maximum value of the original image signal around the edge to set the obtained maximum value as a maximum value of the transient-improved image signal around the edge corresponding to the overshoot; and
obtains a minimum value of the original image signal around the edge to set the obtained minimum value as a minimum value of the transient-improved image signal around the edge corresponding to the undershoot.

15. The apparatus of claim 14, wherein the filter performs 3-tap filtering.

16. An image quality improving apparatus comprising:
a transient improvement circuit configured to reduce edge transition time of an original image signal to form a transient-improved image signal; and
a filter configured to eliminate an overshoot or an undershoot at an edge of the transient-improved image signal,
wherein the transient improvement circuit comprises:
a differential circuit configured to generate a first derivative signal of the original image signal and a second derivative signal of the original image signal;
a multiplier configured to generate an adjustment signal by multiplying the first derivative signal by the second derivative signal; and
an adder configured to sum the original image signal and the adjustment signal, and
wherein the filter obtains a product by multiplying the first derivative signal by the second derivative signal at an edge of the transient-improved image signal, and determines whether an overshoot or an undershoot occurs at the edge of the transient-improved image signal based on the product.

17. The apparatus of claim 16, wherein the filter determines that the overshoot occurs when the product is larger than "0", and that the undershoot occurs when the product is less than "0".

18. An image quality improving apparatus comprising:
a transient improvement circuit configured to reduce edge transition time of an original image signal to form a transient-improved image signal; and
a filter configured to eliminate an overshoot or an undershoot at an edge of the transient-improved image signal,
wherein the transient improvement circuit comprises:
a differential circuit configured to generate a first derivative signal of the original image signal and a second derivative signal of the original image signal;
a multiplier configured to generate an adjustment signal by multiplying the first derivative signal by the second derivative signal; and
an adder configured to sum the original image signal and the adjustment signal, and
the image quality improving apparatus further comprising a suppression controller configured to determine whether each edge of the transient-improved image signal is a high frequency edge, and configured to control the filter so that the filter performs filtering with respect to a non-high frequency edge.

19. The apparatus of claim 18, wherein the suppression controller determines that the edge is the high frequency edge when a summed value of the first derivative signal and an absolute value of the second derivative signal at the edge is larger than a reference value, and determines that the edge is the non-high frequency edge when the summed value is less than the reference value.

20. The apparatus of claim 19, wherein the suppression controller receives the reference value from a reference value register.

21. A display system comprising:
an image source configured to generate an original image signal;
an image quality improving apparatus configured to reduce edge transition time, determine whether each edge of a quality-improved image signal is locally an overshoot or an undershoot, and filter an overshoot or an undershoot signal by using a local maximum or minimum value around an edge of the original image as a local maximum or minimum value of the original image when it is determined that an edge of the transient-improved image signal is locally an overshoot or an undershoot to filter the quality-improved image signal; and
a display device configured to display an image based on the filtered quality-improved image signal, the image quality improving apparatus comprising: a transient improvement circuit configured to reduce edge transition time of the original image signal; and
a filter configured to eliminate an overshoot or an undershoot at edges of the transient-improved image signal.

22. The system of claim 21, wherein the original image signal is a luminance signal.

23. The system of claim 21, wherein the transient improvement circuit comprises:
a differential circuit configured to generate a first derivative signal of the original image signal and a second derivative signal of the original image signal;
a multiplier configured to generate an adjustment signal by multiplying the first derivative signal by the second derivative signal; and
an adder configured to sum the original image signal and the adjustment signal.

24. The system of claim 21, wherein the filter:
determines whether the overshoot or the undershoot occurs at each edge of the transient-improved image signal;
obtains a maximum value of the original image signal around the edge to set the obtained maximum value as a maximum value of the transient-improved image signal around the edge corresponding to the overshoot; and obtains a minimum value of the original image signal around the edge to set the obtained minimum value as a minimum value of the transient-improved image signal around the edge corresponding to the undershoot.

25. The system of claim 24, wherein the filter performs 3-tap filtering.

26. A display system comprising:
an image source configured to generate an original image signal;
an image quality improving apparatus configured to reduce edge transition time and filter an overshoot or an undershoot of the original image to form a quality-improved image signal; and
a display device configured to display an image based on the quality-improved image signal, the image quality improving apparatus comprising: a transient improvement circuit configured to reduce edge transition time of the original image signal; and
a filter configured to eliminate an overshoot or an undershoot at edges of the transient-improved image signal,
wherein the filter:
determines whether the overshoot or the undershoot occurs at each edge of the transient-improved image signal;
obtains a maximum value of the original image signal around the edge to set the obtained maximum value as a maximum value of the transient-improved image signal around the edge corresponding to the overshoot; and
obtains a minimum value of the original image signal around the edge to set the obtained minimum value as a minimum value of the transient-improved image signal around the edge corresponding to the undershoot, and
wherein the filter obtains a product by multiplying the first derivative signal by the second derivative signal at an edge of the transient-improved image signal, and determines whether an overshoot or an undershoot occurs at the edge of the transient-improved image signal based on the product.

27. The system of claim 26, wherein the filter determines that the overshoot occurs when the product is larger than "0," and that the undershoot occurs when the product is less than "0".

28. A display system comprising:
an image source configured to generate an original image signal;
an image quality improving apparatus configured to reduce edge transition time and filter an overshoot or an undershoot of the original image to form a quality-improved image signal; and
a display device configured to display an image based on the quality-improved image signal, the image quality improving apparatus comprising: a transient improvement circuit configured to reduce edge transition time of the original image signal; and
a filter configured to eliminate an overshoot or an undershoot at edges of the transient-improved image signal,
wherein the transient improvement circuit comprises:
a differential circuit configured to generate a first derivative signal of the original image signal and a second derivative signal of the original image signal;
a multiplier configured to generate an adjustment signal by multiplying the first derivative signal by the second derivative signal; and
an adder configured to sum the original image signal and the adjustment signal,
the display system further comprising a suppression controller configured to determine whether each edge of the transient-improved image signal is a high frequency edge, and configured to control the filter so that the filter performs filtering only with respect to a non-high frequency edge.

29. The system of claim 28, wherein the suppression controller is configured to determine that the edge is the high frequency edge when a summed value of the first derivative signal and an absolute value of the second derivative signal at the edge is larger than a reference value and determines that the edge is the non-high frequency edge when the summed value is less than the reference value.

30. The system of claim 29, wherein the suppression controller receives the reference value from a reference value register.

* * * * *